United States Patent [19]

Iechika et al.

[11] Patent Number: 4,721,646
[45] Date of Patent: Jan. 26, 1988

[54] MAGNETIC RECORDING MEDIUM

[75] Inventors: Keigo Iechika; Fuzio Maeda; Masa-aki Imamura, all of Odawara; Yoshiki Kato, Tokyo; Eiichi Takasuna, Odawara; Youichi Kawakubo, Tokorozawa, all of Japan

[73] Assignee: Hitachi, Ltd., Tokyo, Japan

[21] Appl. No.: 901,292

[22] Filed: Aug. 28, 1986

[30] Foreign Application Priority Data

Aug. 28, 1985 [JP] Japan .................. 60-187423

[51] Int. Cl.$^4$ .............................. G11B 5/70
[52] U.S. Cl. .................... 428/143; 428/323; 428/336; 428/694; 428/900
[58] Field of Search ............ 428/143, 323, 336, 694, 428/900; 427/128

[56] References Cited

U.S. PATENT DOCUMENTS

Re. 28,866  6/1976  Haefele et al. ............... 428/336
4,451,532  5/1984  De Palma et al. ............. 428/694

Primary Examiner—Paul J. Thibodeau
Attorney, Agent, or Firm—Fay, Sharpe, Beall, Fagan, Minnich & McKee

[57] ABSTRACT

A magnetic recording medium of the present invention comprises: a substrate; a magnetic film formed on this substrate; and a nonmagnetic reinforcing agent mixed into the magnetic film and projected from the surface of the magnetic film. Assuming that the minimum flying height of the magnetic head which is lifted up over the magnetic film is h, a projection height T of the nonmagnetic reinforcing agent from the surface of the magnetic film satisfies the relation of $h/4 < T < h$. By virtue of this, even if an amount of mixture of the nonmagnetic reinforcing agent which becomes a cause of the generation of the noises is reduced, the necessary durability can be obtained.

14 Claims, 2 Drawing Figures

MAGNETIC RECORDING MEDIUM

BACKGROUND OF THE INVENTION

The present invention relates to a magnetic recording medium and, more particularly, to a magnetic recording medium which has an excellent durability and is capable of reducing noises in magnetic recording and reproduction and is also capable of a high density recording.

High hardness inorganic micropowder (hereinafter, referred to as filler) is mixed as a reinforcing agent into the magnetic recording medium to improve the durability. This filler becomes a cause of generation of the noise in magnetic recording and reproduction. Therefore, to realize a high density recording, the magnetic recording medium is required to be structured so as to provide the necessary durability by use of only a small amount of filler.

U.S. Pat. No. 4,451,532 issued on May 29, 1984 disclosed that in order to improve the durability of the magnetic disk, it is effective to use the filler having a particle diameter greater than not exceeding 20% of a thickness of magnetic coating film. However, no consideration is made with respect to the flying height of the magnetic head. In the magnetic disk for the high recording density, the necessary durability cannot be obtained by the filler of a particle diameter within such a range.

SUMMARY OF THE INVENTION

The present invention is made in consideration of the foregoing problems of the conventional technology and it is an object of the invention to provide a magnetic recording medium in which the generation of the noises in magnetic recording and reproduction can be reduced and the necessary durability is provided and the high density recording can be realized.

Assuming that the minimum flying height of the magnetic head which is lifted up over a magnetic recording medium is h, the magnetic recording medium of the invention features that a projection height T of the filler from the flat surface of the magnetic recording medium has the relation of $h/4 < T < h$.

Namely, the durability of the magnetic recording medium is closely related to the head touch phenomenon with the magnetic head. From this viewpoint, the durability was investigated by changing the flying height of the magnetic head and the projection height of the filler. As a result, it was found that in the case of using the filler having a particle diameter greater than and not exceeding 20% of the thickness of magnetic coating film disclosed in the above-mentioned publication, as the thickness of magnetic coating film becomes thin, it becomes impossible to obtain the necessary durability, and this fact in turn brought the present inventors to realization that it is necessary to specify the filler projection height T using the magnetic head flying height as a reference. Thus, the relation of $h/4 < T < h$ was obtained.

DESCRIPTION OF THE PREFERRED EMBODIMENTS

Figure 1:
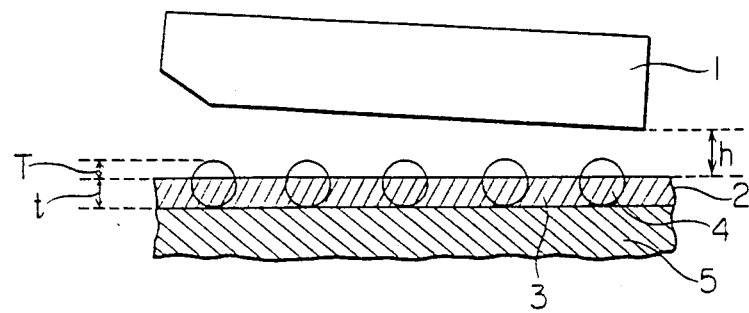
FIG. 1 is a partial cross sectional side elevational view showing the positional relation between a magnetic disk and a magnetic head.

The present invention will be described further in detail hereinbelow with respect to an embodiment shown in the drawings.

FIG. 1 is an explanatory diagram showing the positional relation between a magnetic head 1 and a magnetic disk 2 and illustrating a state in which a filler 4 is projected from the flat portion of a magnetic coating film 3. As shown in FIG. 1, the magnetic disk 2 is formed from the magnetic coating film 3 coated on a magnetic disk substrate 5. The magnetic coating film 3 contains the nonmagnetic reinforcing agent (filler) 4. The filler 4 is a particle of a high hardness inorganic material and, preferably, it has a spherical shape. The magnetic head 1 is lifted up due to the action of an air flow which is caused due to the rotation of the magnetic disk 2. In this case, the minimum flying height assumes h, a projection height of the filler 4 from the flat portion of the magnetic coating film 3 assumes T, and a thickness of film 3 assumes t. The durability of the magnetic disk 2 was measured by the durability test by arbitrarily controlling the projection height T of the filler 4 within a range of $0 < T < h$ by changing the conditions of the surface finishing work of the magnetic coating film 3. Thus, the necessary durability could be obtained under the condition of $h/4 < T < h$.

Figure 2:
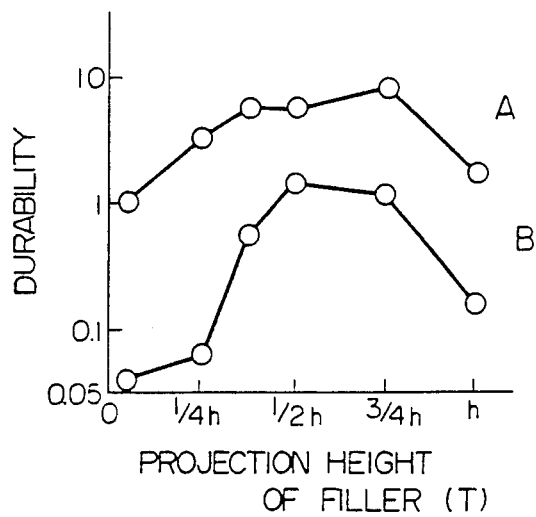
FIG. 2 is a graph showing the relation between the projection height T of filler and the durability.

FIG. 2 shows practical examples of the results of the measurements, in which the abscissa indicates the filler projection height T and the ordinate represents the durability as a parameter. In FIG. 2, a graph A shows the measured values under the conditions that the thickness t of the magnetic coating film 3 is 0.6 μm and the minimum flying height h is 0.48 μm and a graph B likewise shows the measured values under the conditions that the thickness t of the film 3 is 0.3 μm and the minimum flying height h is 0.30 μm.

According to the embodiment, there is the effect in improvement of the durability when the filler projection height T lies within a range of $h/4 < T < h$ and, particularly, in a range of a low head flying height of the thin magnetic coating film 3. Practically speaking, the invention can improve the durability of the magnetic recording medium by about 1.5 to ten times that of the conventional technology.

According to the invention, even if an amount of filler is reduced as well, the magnetic recording medium having the necessary durability can be provided. Thus, the noise which is generated in magnetic recording and reproduction can be reduced and the high density recording can be realized.

We claim:

1. A magnetic recording medium in which a magnetic film containing a nonmagnetic reinforcing agent is formed on a substrate,
    wherein there is a relation of $h/4 < T < h$ between a minimum flying height h of a magnetic head which is lifted up over said magnetic recording medium and a projection height T of said nonmagnetic reinforcing agent from a flat surface of said magnetic recording medium.

2. A magnetic recording medium according to claim 1, wherein said nonmagnetic reinforcing agent is a spherical particle.

3. A magnetic recording medium according to claim 1, wherein said nonmagnetic reinforcing agent is a particle of inorganic material.

4. A magnetic recording medium according to claim 2, wherein said nonmagnetic reinforcing agent is inorganic material.

5. A magnetic recording medium according to claim 1, wherein said magnetic film is a film having a thickness of 0.4 μm or less.

6. A magnetic recording medium according to claim 5, wherein said nonmagnetic reinforcing agent is a spherical particle.

7. A magnetic recording medium according to claim 5, wherein said nonmagnetic reinforcing agent is a particle of inorganic material.

8. A magnetic recording medium according to claim 6, wherein said nonmagnetic reinforcing agent is a high hardness inorganic material.

9. A magnetic recording medium according to claim 1, wherein said relationship is $\frac{2}{3}h < T < \frac{3}{4}h$.

10. A magnetic recording medium according to claim 9, wherein said nonmagnetic reinforcing agent is a spherical particle of inorganic material and said magnetic film has a thickness of 0.4 μm or less.

11. A magnetic recording medium in combination with a transducer head having a minimum flying height of h caused by being lifted up due to the action of air flow during relative movement between the magnetic medium and head, said magnetic recording medium comprising:
   a substrate;
   a magnetic film coating said substrate;
   spherical inorganic particles contained within said film, having the relationship of $h/4 < T < h$, wherein T is the projection height of the particles above the coating.

12. The magnetic recording medium combination as set forth in claim 11, wherein said magnetic film has a thickness of 0.4 μm or less.

13. The magnetic recording medium according to claim 11, wherein said magnetic film has a thickness of 0.3 μm or less.

14. The magnetic recording medium combination according to claim 13, wherein said relationship is $\frac{2}{3}h < T < \frac{3}{4}h$.

* * * * *